United States Patent Office 3,560,254
Patented Feb. 2, 1971

3,560,254
GRAFTING POLYMERS ON GLASS AND
LIKE SILICEOUS MATERIALS
John David Seddon, Runcorn, England, assignor to Imperial Chemical Industries Limited, London, England
No Drawing. Filed Sept. 8, 1966, Ser. No. 577,826
Claims priority, application Great Britain, Sept. 16, 1965, 39,583/65
Int. Cl. C08f 1/76
U.S. Cl. 117—124                                11 Claims

ABSTRACT OF THE DISCLOSURE

There is provided a process for coating the surface of glass and like siliceous materials with a polymeric material wherein the glass is first treated with a compound which forms a chemical bond with the surface of the glass and is also capable of acting as an initiator in a polymerization reaction for the coating of polymeric material. Suitably a polar vinyl monomer is polymerized by initiation of the coating and the coating is a two-component initiator system consisting of a transition metal carbonyl or isocyanide and a compound represented by the formula $X_3C-Y-SiZ_3$ where X is halogen, Y is a direct link or a divalent organic radical and Z is halogen or alkyl linked to the silicon atom via an oxygen atom. Such coated glass surfaces may be thereafter dyed to present a colored surface.

---

This invention relates to a process for coating the surface of glass and like siliceous materials (hereinafter referred to collectively as "siliceous material") with a polymeric material.

There is a growing interest in what are commonly termed "composite materials" in which two or more components, e.g. glass fibre and synthetic resins, are bonded together in a single material to enable their dissimilar but individually desirable properties to be combined in a single material.

For example, the composite material may take the form of glass fibres coated with a thermoplastic material having good dye receptivity; by this means a high strength fibre may be used in applications from which it had previously been barred by its poor dye receptivity. However, it has hitherto only been possible to apply such coatings by physical means, e.g. by treating the surface of the material with a molten thermoplastic; but such methods do not establish a chemical bond between the siliceous material and the polymer.

We have now found that a surface coating of a polymeric material may be applied to a siliceous material by treating it with a compound which forms a chemical bond with the surface of the siliceous material and is also capable of acting as an initiator in a polymerisation reaction in which the said polymeric material is produced.

Accordingly, we provide a process for producing on the surface of a siliceous material an adherent coating of a polymer of an ethylenically unsaturated monomer which comprises treating the ethylenically unsaturated monomeric material, normally polymerisable by a free radical mechanism, with a two-component polymerisation initiator comprising (i) an organic complex of a transition metal and (ii) an organic compound containing a C- or N-halide group and a group which forms a stable chemical bond with the surface of the siliceous material, in the presence of a siliceous surface.

By the term "siliceous material" we mean a compound containing silicon bound to four oxygen atoms tetrahedrally surrounding each silicon atom; metals other than silicon may also be present in the material.

Such materials include glass, silica, and natural silicate minerals, including mica and asbestos. The materials may be in massive form, or in the form of sheets, fibres or particles.

By "stable chemical bond" we mean a bond which is not destroyed by solvolysis, especially hydrolysis as previously mentioned.

The ethylenically unsaturated monomers suitable for the process of our invention are those whose polymerisation is normally initiated by free radical catalysts and especially those containing an electron-attracting group, e.g. a carboxylic acid or ester group, attached to an ethylenically bound carbon atom. Examples of monomers containing electron-attracting groups include vinyl pyridines, acrylic monomers (for example acrylic and methacrylic acids and their esters, amides, nitriles and homologues) and aralkenes (for example styrene) and mixtures thereof. Other monomers, e.g. vinyl chloride, vinyl esters (as in vinyl acetate) and vinylidene chloride may also be used in our process.

Component (i) of our initiator system may be, in particular, a transition metal carbonyl.

Examples of transition metal carbonyls include simple carbonyls of iron, cobalt, nickel, molybdenum, chromium, tungsten, manganese or rhenium, for example molybdenum hexacarbonyl, tungsten hexacarbonyl, dicobalt octacarbonyl, tetracobalt dodecacarbonyl, iron pentacarbonyl, iron enneacarbonyl, tri-iron dodecacarbonyl chromium hexacarbonyl or mixtures thereof.

There may also be used as the transition metal carbonyl a transition metal derivative having one or more other groups, in addition to one or more carbonyl groups, attached to the metal atom; i.e. part carbonyls, for example metal carbonyl halides and metal cyclopentadienyl carbonyls and bridged dinuclear metal carbonyls.

The metal carbonyl may be improved by use in conjunction with a phosphine, for example as described in our copending patent application Ser. No. 476,696, filed Aug. 20, 1964, now abandoned. The carbonyl may be prereacted with a phosphine to yield a carbonyl-phosphine complex or the carbonyl and the phosphine may be used in simple admixture.

Other organic complexes that may be used are isocyanides, particularly the arylisocyanides of chromium.

Component (ii) of the initiator system is a compound containing a C- or N-halide group and a group which forms a stable chemical bond with a surface of the siliceous material.

The group which forms the chemical bond with the surface preferably contains a silicon atom; especially suitable are groups containing silicon-halogen, e.g. silicon-chlorine, linkages.

In general, stronger bonds are formed where the reactive group contains several chlorine atoms linked to a single silicon atom. Also suitable are groups containing Si—O—R linkages where R is a hydrocarbyl radical.

As previously mentioned, a C- or N-halide group must also be present in this component of the initiator system, and is believed to act as the initiator for the polymerisation reaction. Compounds having a C-halide group are generally more readily available.

In general the activity of this component of the initiator system in the polymerisation reaction is improved by increasing the number of halide atoms linked to the same carbon atom, or to a lesser extent, by having electron withdrawing groups (e.g. $C_6H_5$—, —COOH or —$CONH_2$) attached to the same carbon atom. Without limiting the invention thereby, it is believed that the silicon-halogen or Si—O—R linkage of component (ii) of our initiator reacts with Si—O—H groups on the surface of the siliceous material giving Si—O—Si linkages which are known to be very stable, and thus bond the C- or N-halogen group of the said component, to the surface of the siliceous material. Thus, since the C- or N-halide groups act as initiators in the subsequent polymerisation reaction, it is thought that in the final product a continuous chain of stable chemical bonds exists between the siliceous material and the polymer. It has been postulated that the effective surface of a siliceous material is a tightly bond monomolecular layer of water but the exact nature of the surface is still open to discussion.

Preferred compounds which are noted both for their high reactivity with siliceous material, essentially glass, and their activity in promoting polymerisation may be represented as having the structure:

$$X_3C-Y-SiZ_3$$

where X is a halogen atom, generally chlorine or bromine, and Y is a direct link or a divalent organic radical, generally a divalent hydrocarbon group, and Z is a halogen atom or an hydrocarbyl group linked to the silicon atom via on an oxygen atom, e.g. an alkoxy group. When Z is a halogen atom it is preferably a chlorine atom.

We have found p-trichlortolyl trichlorsilane to be particularly suitable but other compounds that may be mentioned are chlorinated alkyl trichlorsilanes e.g. β-trichloroethyl trichlorsilane.

The process of the invention is effected by polymerising the ethylenically unsaturated material using our specified initiator system and in the presence of the siliceous material.

When the siliceous material in glass, it may be in sheet form where a coated glass sheet is required, or may be particulate or in the form of fibres or filaments. Where it is in sheet form, one side may be protected from treatment, if desired. The process may also be used to treat glazed surfaces.

In a preferred process, the siliceous material is treated with a solution of an oragnic compound having the required active groups in a suitable inert solvent, e.g. toluene, and is then treated with a mixture of the polymerisable material and the organic transition metal complex. The solution of the organic compound is effective even when in dilute form, concentrations of 5 g. of compound per 100 ml. of solvent being qiute sufficient for most purposes.

The siliceous material is preferably soaked in the solution and then removed and washed to clean off any excess of the organic compound. Thereafter, it may be immersed in a solution of the organic transition metal complex in the polymerisable material where the latter is liquid. If the polymerisable material is normally solid under the treatment conditions or dilution is required, both the organic transition metal complex and the polymerisable material may be used in admixture with a suitable organic solvent or diluent. Suitable solvents or diluents for this purpose include ethers (for example tetrahydrofuran), esters (for example ethyl acetate) and nitriles (for example benzonitrile), or mixtures thereof. Some solvents may act as chain transfer agents in the polymerisation process.

The amount of organic transition metal complex used is generally up to about $10^{-2}$ gm. mole per litre in the reaction medium. Larger proportions may be used if desired although it may be found that little or no additional advantage is thereby achieved and in some cases, even, the yield may be adversely affected. It is preferred to use proportions in the range $1 \times 10^{-5}$ to $1 \times 10^{-3}$ gm. mole per litre.

The polymerisation may be aided photochemically or, more often, by heat. Conveniently the temperature lies in the range 20° C. to 100° C., preferably 40° C. to 90° C., although higher or lower temperatures may be used, if desired. The polymerisation may be effected at substantially atmospheric pressure, although higher or lower pressures may be used particularly where the monomer is volatile. The time required for the polymerisation is dependent upon several factors, including the individual components employed, their concentration and the temperature of polymerisation.

In general, in the free-radical polymerisation of ethylenically unsaturated monomers it is desirable to exclude oxygen from the reaction mixture since this is normally regarded as an inhibitor of such polymerisation. We have found that our process proceeds satisfactorily in many cases without the need for such precautions. It will be appreciated that working in this way has many practical advantages.

After treatment, the product may be washed to remove any excess polymer before use.

The treated products obtained by our process have good dye receptivity.

Fillers, pigments, heat and light stabilisers and other additives may be incorporated in the coatings on the siliceous surfaces by conducting the polymerisation in their presence but care must be taken to choose additives that will not prevent successful completion of the polymerisation reaction.

The invention is now illustrated but in no way limited by the following examples in which all parts are expressed as parts by weight.

EXAMPLE 1

A weighed microscope slide was cleaned, washed in toluene and then immersed overnight in a bath containing a solution of trichlorotolyl trichlorosilane in toluene. The solution strength was 5 gms. of trichlorosilane per 100 mls. of solvent.

The slide was then removed, washed with toluene and suspended in an open vessel in a mixture of 9.36 parts of methyl methacrylate and 0.01 part of a metal complex having the formula $Ni_2(CO)_6P_2(C_6H_5)_4$ and the probable structure:

$$(CO)_3Ni \leftarrow P(C_6H_5)_2.P(C_6H_5)_2 \rightarrow Ni(CO)_3$$

hereinafter referred to as metal complex A.

The mixture was heated to 80° C. for 2 hours and then the slide was removed, washed by immersion in refluxing chloroform to remove any methyl methacrylate homopolymer and dried.

The dried article showed a weight increase of 1.2% due to the treatment and could be coloured by immersion in an aqueous dispersion of "Duranol-Brilliant Blue" dye. A slide which had not been treated according to our invention showed no dye-uptake under identical conditions. The untreated siliceous articles used in Examples 2–17 and 22–28 showed no dye uptake under the dyeing conditions appropriate to each example.

A similar microscope slide was treated with molten methyl methacrylate. This treatment produced a film of methyl methacrylate on the slide which was then washed by immersion in refluxing chloroform. The washed slide showed no uptake of dye under the conditions previously used. This demonstrates that the coating produced by our process is much more resistant to solvolysis than the equivalent homopolymer, and indicates that a stable chemical bond is formed between the coating and the surface of the siliceous material.

EXAMPLE 2

A microscope slide was cleaned and washed in toluene, weighed and then immersed for 45 minutes at 25° in a bath containing a 5% (w./w.) solution of trichlorotolyl trichlorosilane in toluene.

The slide was removed, washed with toluene and suspended in an open vessel in a mixture of 10.0 parts of 4-vinyl pyridine and 0.01 part of metal complex A.

The mixture was heated to 80° C. for 2 hours and then the slide was removed, washed by immersion in refluxing ethanol to remove any 4-vinyl pyridine homopolymer, and dried. The dried slide showed a weight increase of 0.3% due to the treatment and could be coloured by treating with "Azogeranine" dye.

EXAMPLE 3

A microscope cover slip was cleaned, weighed and treated with a 5% solution of trichlorotolyl trichlorosilane as in Example 1, the slip was removed, washed with toluene and suspended in an open vessel in a mixture of 5.0 parts of methacrylic acid and 0.005 part of metal complex A. The mixture was heated to 80° C. for 2 hours and then the slip was removed, washed by immersion in refluxing methanol to remove any methacrylic acid homoplymer and dried.

The dried slip showed a weight increase of 0.7% due to the treatment and could be coloured by treating with "Magenta RBNS" dye.

EXAMPLE 4

A microscope cover slip was cleaned, weighed and treated with trichlorotolyl trichlorosilane as in Example 2, the slip was removed, washed with toluene, suspended in an open vessel in a mixture of 10.0 parts of 2-hydroxyethyl methacrylate and 0.01 part of metal complex A. The mixture was heated to 80° C. for 2 hours and then the slip was removed, washed by immersion in refluxing chloroform to remove any 2-hydroxyethyl methacrylate homoploymer and dried.

The dried slip showed a weight increase of 0.2% due to the treatment and could be coloured by treating with "Procion H3BNS" dye.

EXAMPLE 5

A microscope cover slip was cleaned, weighed and treated with trichlorotolyl trichlorosilane as in Example 2. The slip was removed, washed with toluene and suspended in an open vessel in a mixture of 10 parts of 2-(t-butylamino)ethyl methacrylate and 0.01 part of metal complex A.

The mixture was heated to 80° C. for 2 hours and then the slip was removed, washed by immersion in refluxing chloroform to remove any 2-(t-butylamino)ethyl methacrylate homopolymer and dried. The dried slip showed a weight increase of 0.34% due to the treatment and could be coloured by treating with "Procion M5B" dye.

EXAMPLE 6

A microscope slide was cleaned, weighed and treated with trichlorotolyl trichlorosilane as in Example 2. The slide was removed, washed with toluene and suspended in an open vessel, in a mixture of 10 parts ethyl acrylate and 0.01 part of metal complex A.

The mixture was heated to 80° C. for 2 hours, then the slide was removed, washed by immersion in refluxing chloroform to remove any ethyl acrylate homopolymer and dried. The dried slide showed a weight increase of 0.13% due to the treatment and could be coloured by treating with "Duranol Brilliant Blue" dye.

EXAMPLE 7

2.7 parts of glass fibre, which had been cleaned by refluxing in toluene and drying, was soaked in a 1% (w./w.) solution of trichlorotolyl trichlorosilane in toluene for 45 minutes at 25° C. The glass fibre was removed, washed with toluene and dried, and suspended in an open vessel in a mixture of 75 parts of methyl methacrylate and 0.05 part of metal complex A. The solution was heated to 80° C. for 2 hours and then the glass fibre was removed, washed by immersion in refluxing chloroform to remove any methyl methacrylate homopolymer and dried. The glass fibre showed a weight increase of 5.9% and could be dyed with "Duranol Brilliant Blue" dye.

EXAMPLE 8

Glass fibre was subject to the process of Example 7 using 4-vinyl pyridine in place of methyl methacrylate. Homopolymer was removed with ethanol. The glass fibre showed a weight increase of 5.4% and could be dyed with "Azogeranine" dye.

EXAMPLE 9

A microscope cover slip was cleaned, weighed and treated with trichlorotolyl trichlorosilane as in Example 2 and then removed, washed with toluene and suspended in a mixture of 10 parts methyl methacrylate and 0.01 part molybdenum hexacarbonyl placed in a sealed vessel in the absence of air. The mixture was heated to 80° C. for 2 hours and then the slip was removed, washed by immersion in refluxing chloroform to remove any methyl methacrylate homopolymer and dried. The dried slip showed a weight increase of 0.9% due to the treatment and could be coloured by treating with "Duranot Brilliant Blue" dye.

EXAMPLE 10

A microscope cover slip was cleaned, weighed and treated with trichlorotolyl trichlorosilane as in Example 2 and then removed, washed with toluene and suspended in an open vessel in a mixture of 10 parts methyl methacrylate and 0.01 part of dimanganese decacarbonyl. The mixture was heated to 80° C. for 2 hours and then the slip was removed, washed by immersion in refluxing chloroform to remove any methyl methacrylate homopolymer and dried. The dried slip showed a weight increase of 0.1% due to the treatment and could be coloured by treating with "Duranol Brilliant Blue" dye.

EXAMPLE 11

A microscope cover slip was cleaned, weighed and treated with trichlorotolyl trichlorosilane as in Example 2 and then removed, washed with toluene and suspended in an open vessel in a mixture of 10 parts methyl methacrylate, 0.003 part of molybdenum hexacarbonyl and 0.01 part triphenyl phosphine.

The mixture was heated to 80° C. for 2 hours and then the slip was removed, washed by immersion in refluxing chloroform to remove any methyl methacrylate homopolymer and dried. The dried slip showed a weight increase of 0.35% and could be coloured with "Duranol Brilliant Blue" dye.

EXAMPLE 12

A microscope cover slip was cleaned, washed in toluene, weighed and immersed for 45 minutes at 25° in a bath containing a 5% (w./w.) solution of trichloromethyl trichlorosilane in toluene. The slide was removed, washed with toluene and suspended in an open vessel in a mixture of 10 parts methyl methacrylate and 0.01 part of metal complex A. The mixture was heated to 80° C. for 2 hours and then the slip was removed, washed by immersion in refluxing chloroform to remove any methyl methacrylate homoploymer and dried. The dried slip showed a weight increase of 0.2% due to the treatment and could be coloured by treating with "Duranol Brilliant Blue" dye.

EXAMPLE 13

Example 12 was repeated using a compound prepared by the chlorination of ethyltrichlorosilane, and believed to be a mixture of tri, tetra, and pentachloroethyl trichlorosilane, instead of trichloromethyl trichlorosilane. The gain in weight was 0.1% and the slip could be dyed as in Example 12.

EXAMPLE 14

Example 12 was repeated using a compound prepared by the reaction of trichloromethyl trichlorosilane with methanol, and believed to be trichloromethyl trimethoxysilane, instead of trichloromethyl trichlorosilane.

The gain in weight was 0.2% and the product dyed as in Example 12.

EXAMPLE 15

Example 12 was repeated using a compound prepared by the reaction of trichlorotolyl trichlorosilane with methanol and believed to be trichlorotolyl trimethoxysilane, instead of trichloromethyl trichlorosilane. There was no apparent gain in weight but the product could be dyed as in Example 12.

EXAMPLE 16

Example 12 was repeated using a compound prepared by the reaction of the mixed chloroethyl trichlorosilanes, used in Example 13, with methanol, and believed to be a mixture of tri, tetra, and pentachloro trimethoxysilane, instead of trichloromethyl trichlorosilane.

The gain in weight was 0.1% and product could be dyed as in Example 12.

EXAMPLE 17

25.27 parts of glass beads small enough to pass through a BS 200 mesh sieve were cleaned, weighed and treated with a 5% (w./w.) solution of trichlorotolyl trichlorosilane as in Example 2. The beads were removed, washed with toluene and placed in an open vessel containing 20 parts of ethyl acrylate and 0.02 part of metal complex A. The mixture was heated to 80° C. for 2 hours and then the beads were removed, washed by immersion in refluxing chloroform to remove any ethyl acrylate homopolymer and dried. The dried beads showed a weight increase of 3.18% and could be coloured by treating with "Duranol Brilliant Blue" dye.

EXAMPLE 18

1.12 parts of white asbestos fibre were cleaned in refluxing toluene, dried, weighed and then immersed in a 1% solution of trichlorotolyl trichlorosilane in toluene for 20 minutes at 25°. The asbestos was removed, washed with toluene an then placed in an open vessel with 10 parts methyl methacrylate and 0.01 part of metal complex A. The mixture was heated at 80° C. for 2 hours and then the asbestos was removed, washed by an immersion in refluxing chloroform to remove any methyl methacrylate homopolymer and dried. The asbestos showed a weight increase of 1.2% due to the treatment.

EXAMPLE 19

1.02 parts of white asbestos fibre were treated as in Example 18 but 10 parts of styrene were used instead of the methyl methacrylate. The asbestos showed a weight increase of 8.2% due to the treatment.

EXAMPLE 20

0.99 part of mica was treated as in Example 18. The mica showed a weight increase of 6.8% due to the treatment.

EXAMPLE 21

0.94 part of mica was treated as in Example 19, the mica showed a weight increase of 5.9% due to the treatment.

EXAMPLE 22

A microscope cover slip was treated as in Example 22 treated with trichlorotolyl trichlorosilane as in Example 2. The slip was washed with toluene and suspended in an open vessel in a mixture of 10 parts acrylonitrile and 0.01 part of metal complex A.

The mixture was heated to 80° C. for 2 hours and then the slip was removed, washed with dimethyl formamide to remove any acrylonitrile homopolymer and dried.

The dried articles showed a weight increase of 0.5% due to the treatment and could be dyed by treating with "Duranol Brilliant Blue" dye.

EXAMPLE 23

A microscope cover slip was treated as in Example 22 but 10 parts of vinyl acetate were used instead of acrylonitrile. The vinyl acetate homopolymer was removed by washing the slip with benzene. The weight increase due to the treatment was 0.3% and the slip could be dyed by treating with "Duranol Brilliant Blue" dye.

EXAMPLE 24

A microscope cover slip was cleaned, weighed and treated with trichlorotolyl trichlorosilane as in Example 2. The slip was washed with toluene and suspended in an open vessel in a mixture of 10 parts methyl methacrylate and 0.01 part tungsten hexacarbonyl.

The mixture was heated to 80° C. for 2 hours and then the slip was removed, washed with chloroform to remove any methyl methacrylate homopolymer and dried. The dried article showed a weight increase of 0.1% and could be dyed by treating with "Duranol Brilliant Blue" dye.

EXAMPLE 25

A microscope cover slip was treated as in Example 24 but, instead of tungsten hexacarbonyl, 0.01 part of chromium hexacarbonyl was used. The weight increase was 0.1% and the slip could be dyed as in Example 24.

EXAMPLE 26

A microscope cover slip was treated as in Example 24 but, instead of tungsten hexacarbonyl, 0.01 part of the metal complex having the formula

$$Fe_2(CO)_5 \cdot P_2(CH_3)_4 \cdot P(C_6H_5)_3$$

and the probable structure

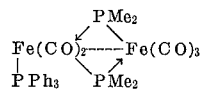

were used.

The weight increase was 0.2% and the slip could be dyed as in Example 24.

EXAMPLE 27

A microscope cover slip was treated as in Example 24 but, instead of tungsten hexacarbonyl, 0.01 part of a metal complex having the formula $$Fe_2(CO)_6(S \cdot CH_3)_2$$

and the probable structure

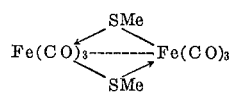

were used.

The weight increase was 0.3% and the slip could be dyed as in Example 24.

EXAMPLE 28

A microscope cover slip was treated as in Example 9 but, instead of molybdenum hexacarbonyl, 0.01 part of a metal complex believed to have the structure

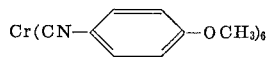

was used. The reaction was again conducted in the absence of air, the increase in weight was 0.1% and the slip could be dyed as in Example 9.

I claim:

1. A process which comprises contacting a siliceous surface with a polar vinyl monomer selected from the group consisting of acrylic acid, methacrylic acid, methyl methacrylate, 2-(t-butylamino)ethyl methacrylate, 2-hydroxy ethyl methacrylate, acrylonitrile, ethyl acrylate, vinyl acetate, 4-vinyl pyridine and styrene in the presence of a two-component polymerisation initiator consisting of:
   (i) a transition metal carbonyl having less than 13 carbon atoms or aryl isocyanide, wherein said transition metal is selected from the group consisting of iron, cobalt, nickel, molybdenum, chromium, tungsten, manganese and rhenium; and
   (ii) a silicon compound represented by the formula selected from the group consisting of:

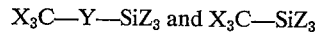
   $$X_3C—Y—SiZ_3 \text{ and } X_3C—SiZ_3$$

wherein
   X is a halogen atom,
   C is a carbon atom,
   Y is a divalent hydrocarbon radical having from 1 to 7 carbon atoms, and Z is a halogen atom or lower alkoxy radical having from 1 to 6 carbon atoms
thereby causing the said monomeric material to polymerise on the surface of the siliceous material and adhere thereto.

2. A process as claimed in claim 1 in which the siliceous material is glass.

3. A process as claimed in claim 1 in which the siliceous material is selected from mica and asbestos.

4. A process as claimed in claim 1 in which the carbonyl is a carbonyl phosphine complex having the formula $Ni_2(CO)_6P_2(C_6H_5)_4$ and structure

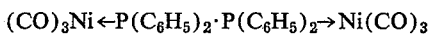

5. A process as claimed in claim 1 in which the carbonyl has the formula $Fe_2(CO)_5P_2(CH_3)_4P(C_6H_5)_3$ and the structure

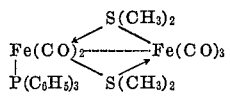

6. A process as claimed in claim 1 in which the carbonyl has the formula $Fe_2(CO)_6(SCH_3)_2$ and the structure

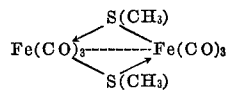

7. A process as claimed in claim 1 in which the silicon compound is trichlorotolyl trichlorosilane.

8. A process as claimed in claim 1 in which the siliceous material is first treated with the silicon compound of the initiator.

9. A process as claimed in claim 8 in which the siliceous material is first soaked in a solution of the silicon compound, washed to remove any excess of the solution, and the treated material is then contacted wtih the polar vinyl monomer and the said transition metal compound of the initiator.

10. A process as claimed in claim 8 in which the monomer and the transition metal compound are then used in admixture with an organic solvent or diluent.

11. A process as claimed in claim 1 which is carried out in the presence of air.

References Cited
UNITED STATES PATENTS 3,178,380   4/1965   Porret   117—124X
3,433,774   3/1969   Bamford et al.   260—80

ALFRED L. LEAVITT, Primary Examiner

W. F. CYRON, Assistant Examiner

U.S. Cl. X.R.
117—72, 126